United States Patent Office 3,049,569
Patented Aug. 14, 1962

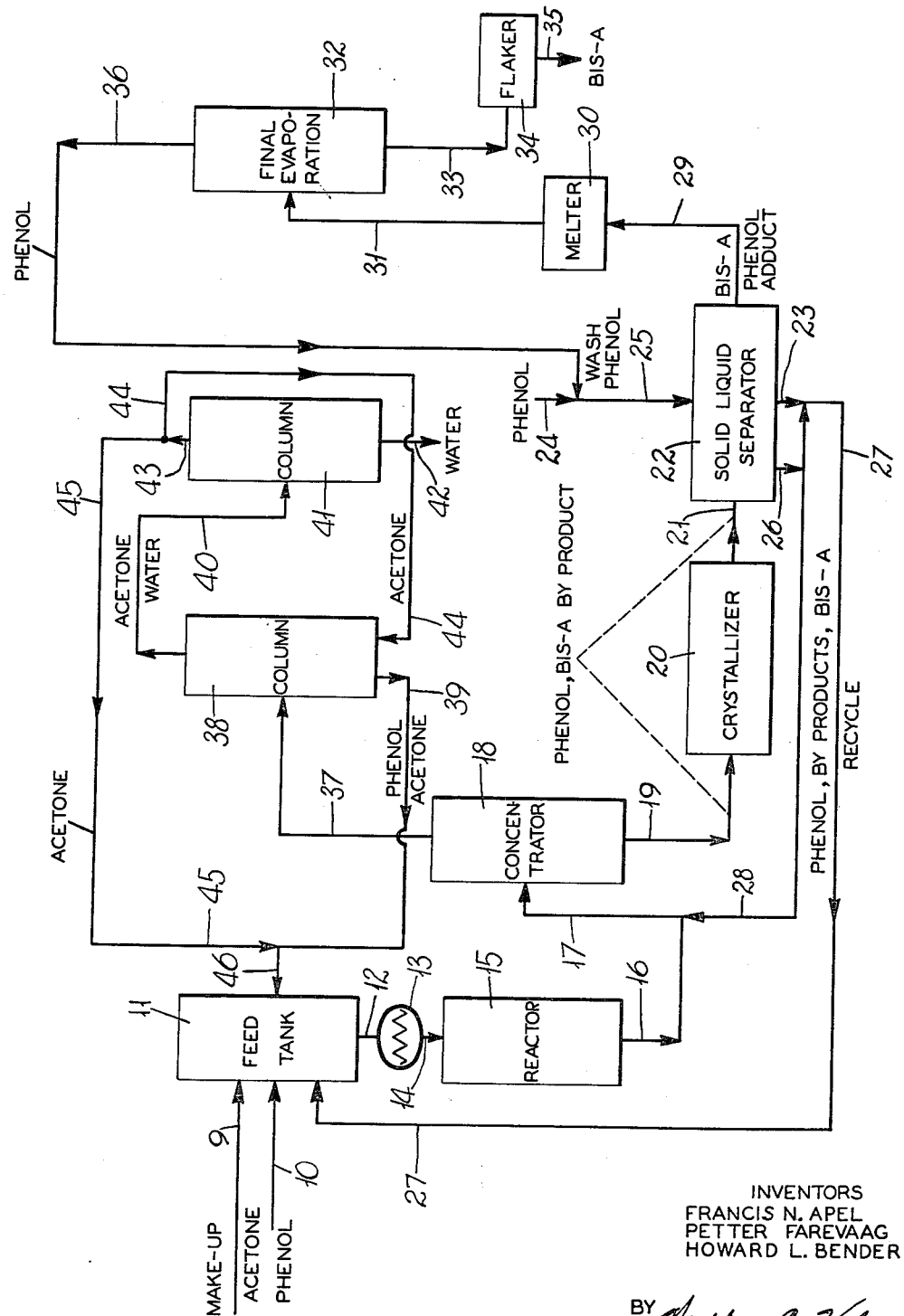

3,049,569
PRODUCTION OF 2,2-BIS(4-HYDROXYPHENYL)
PROPANE
Francis N. Apel, Nutley, Petter Farevaag, Princeton, and Howard L. Bender, Sparta, N.J., assignors to Union Carbide Corporation, a corporation of New York
Filed Oct. 20, 1958, Ser. No. 768,409
13 Claims. (Cl. 260—619)

This invention relates to the production of 2,2-bis(4-hydroxyphenyl)propane. More particularly, it relates to a continuous process for the production of ultra-high purity 2,2-bis(4-hydroxyphenyl)propane.

Presently known processes can not supply commercial quantities of 2,2-bis(4-hydroxyphenyl)propane with a sufficient degree of purity for all applications. For example, large quantities of 2,2-bis(4-hydroxyphenyl)propane are used as a basic starting material in the burgeoning field of epoxy resins and also in the more recent, and even more rapidly expanding field of polycarbonate resins. Epoxy resin applications require a 2,2-bis(4-hydroxyphenyl)propane of at least 92% purity, and polycarbonate resin applications require a 2,2-bis(4-hydroxyphenyl)propane starting material of even higher purity.

The presence of more than slight amounts of impurities has been found to have a disproportionately deleterious effect on the quality of these polymers. Known purification procedures can upgrade commercially available 2,2-bis(4-hydroxyphenyl)propane to a purity of about 96%. This is generally sufficient for epoxy resin applications, but only complex purification procedures are able to provide a 2,2-bis(4-hydroxyphenyl)propane starting material sufficiently pure for use in polycarbonate resin production. In addition, these purification procedures are costly in time, equipment, and material consumed. Processes currently employed for production of 2,2-bis(4-hydroxyphenyl)propane, condense phenol with acetone in the presence of a mineral acid condensing agent or condensation catalyst. The stronger mineral acids such as sulfuric acid and hydrochloric acid are commonly used, and even preferred, in these processes despite the operating difficulties they present. Even with the use of these powerful catalysts, known processes require extended periods of contact between the reactants and the catalysts. Contact times of from 10 to 16 hours and longer are not uncommon. Efforts to reduce the length of contact time which is, of course, economically critical in a commercial process have heretofore involved either additional processing steps or the use of catalyst promoters.

For example, it has been suggested to include a soaking step following the condensation reaction. This expedient is in essence merely a two-step reaction and reduces the contact period only slightly over an identical reaction carried out without the soaking step and does not significantly increase product purity over previously achieved levels. Mineral acid-catalyzed acetone and phenol condensations are disadvantageous in the time required for reaction and the product obtained has a purity of only 75% to about 92% at best. This level of purity is completely unsuitable for starting material in polycarbonate resin production and only barely suitable as a starting material for epoxy resin production even after being upgraded.

The use of catalyst promoters is known to markedly increase the rate of condensation of phenol and acetone to 2,2-bis(4-hydroxyphenol)propane. Product contamination, however, is commensurately increased. Materials ordinarily employed as acetone and phenol condensation reaction promoters are solid, liquid or gaseous sulfur-containing compounds which are soluble in the reaction mixture. In all heretofore known reactions these materials or their reaction by-products have invariably occurred as impurities in the product. These impurities, which impart both a characteristic odor and a distinct color to the 2,2-bis(4-hydroxyphenyl)propane, are removable only with difficulty, if at all. Separation difficulties have thus far substantially negatived the advantages in rate obtained with promoters used in conjunction with mineral acid catalysts in known commercial processes. As a result, presently known processes compromise either speed of reaction by excluding promoters or purity of product by utilizing them.

Because large commercial quantities of 2,2-bis-(4-hydroxyphenyl)propane having a purity above about 92 percent are not available at the present time, the best available grades of 2,2-bis(4-hydroxyphenyl)propane, 92% pure, are further purified, e.g. by recrystallization from phenol. Recovery of the purified product from the recrystallization procedure varies from about 50 percent to a rarely achieved 90 percent and hence adds considerably to the cost of the 2,2-bis(4-hydroxyphenyl)propane product finally obtained.

It is apparent therefore that known processes for the continuous production of 2,2-bis(4-hydroxyphenyl)propane are unable to provide the rapidly growing epoxy resin and polycarbonate resin industries with the basic raw material upon which these industries depend in the quality and quantity they demand. The need for a source of ultra-high purity, i.e. 99% plus 2,2-bis(4-hydroxyphenyl)-propane at a reasonable price is becoming increasingly acute. Modifications of known continuous processes by the use of specially developed catalyst promoters and the addition of extra reaction and/or purification steps have not been able to answer this need and have, in fact, only increased the cost.

It is an object, therefore, of our invention to provide a continuous process wherein a condensation product of acetone and phenol of an ultra-high purity 2,2-bis(4-hydroxyphenyl)propane is achieved.

It is another object of our invention to provide a continuous process for the production of commercial quantities of nearly theoretical yields of ultra-high purity 2,2-bis(4-hydroxyphenyl)propane.

It is another object of our invention to provide a process for the production of nearly theoretical yields of 2,2-bis(4-hydroxyphenyl)propane wherein the product is inherently free from all traces of both the catalyst and promoter.

It is still another object of our invention to provide a process for the production of ultra-high purity 2,2-bis(4-hydroxyphenyl)propane wherein process efficiencies closely approach 100% in continuous operation.

In accordance with the present invention, we have now discovered that these and other objects are accomplished by continuously contacting under substantially anhydrous conditions a mixture of acetone and phenol wherein phenol is present in an amount in excess of stoichiometric proportions, with a substantially insoluble cationic exchanging resin at a temperature from about 30° C. to 125° C. to effect the interreaction between phenol and at least a part of the acetone, separating the effluent from the reaction zone into two streams, one containing a 2,2-bis(4-hydroxyphenyl)propane-phenol adduct, reaction by-products and some free phenol and isolating the reaction by-products and the 2,2-bis(4-hydroxyphenyl)propane from the first stream, and preferably dehydrating the second stream containing the acetone, water and the remainder of the free phenol and recycling the reaction by-products, acetone and phenol to the reaction zone.

The size and dimensions of the reaction zone are not critical, provided adequate contact of the reactants with the cation exchanging resin is obtained. Suitable reaction zones, for example, are those of enlarged cross sections such as a chamber, tank, autoclave or the like and those of restricted cross-sections such as a tubular reactor and coil or the like. A plurality of reaction zones connected for series or parallel flow can be employed within the scope of the invention. Suitably they are equipped with means for maintaining or adjusting the temperature within the reaction zone and means for preventing entrainment of the catalyst in the effluent.

The time of residence of the acetone and phenol in the reaction zone can vary considerably within the scope of the present invention depending upon the specific molar ratio of the reactants, the amount and type of cation exchanging catalyst employed, temperatures used, percent conversion desired, etc. Residence time, as a minimum, is the time sufficient to initiate the reaction and, as a maximum, the time sufficient to substantially complete interreaction between the reactants present. We prefer a 20% conversion of reactants as a minimum and an 80% conversion as a maximum. We particularly prefer a conversion of about 50%, since at increased conversions the reaction rate declines rapidly and the process becomes increasingly less economical in terms of amount of product per unit time. No particular residence time is critical in the present invention with regard to yield, the same extremely high yields being obtained with comparatively short contact times and low conversions as are achieved with long contact times and high conversions. Contact times of as little as one hour and a conversion of about 50% is the most desirable, since it provides yields of about 99% of the theoretical, based on acetone consumed, of 2,2-bis(4-hydroxyphenyl)propane, having an extremely high purity.

Phenol as used herein refers to only phenyl hydroxide and acetone as used herein refers to only dimethyl ketone.

The process of our invention is preferably carried out with an amount of phenol in excess of stoichiometric quantities, i.e. more than 2 moles of phenol per mole of acetone present in the reaction zone, and preferably between about 3 to 20 moles of phenol per mole of acetone. The higher ratios of phenol to acetone, i.e. about 12:1 or more are desirable where the temperature of the reaction zone is comparatively low since this inhibits clogging of the reaction zone with solidified reaction products or crystallized adducts of phenol with the reaction products. A ratio of 6:1 to 12:1 of phenol to acetone is particularly preferred. At a conversion of 50% based on the acetone consumed, a phenol to acetone ratio of 10:1 is particularly preferred. While minor amounts of substantially inert solvents, such as pentane, cyclohexane or benzene do not completely inhibit the reaction, they do complicate the separation steps in the process and their presence is not particularly desired.

It is essential in order to maintain high rates of 2,2-bis(4-hydroxyphenyl)propane formation in continuous operation that substantially anhydrous reactants, i.e., containing less than 2.0 percent water, be fed to the reaction zone, since the overall efficiency of the process of the invention is dependent upon the presence of less than 2.0 percent of water in the reaction zone for optimum catalysis with the cationic exchanging resins.

The temperature within the reaction zone should be such as will maintain the reactants in the liquid phase. In general, the lower the temperature employed in the reaction zone, the lower the concentration of 2,2-bis(4-hydroxyphenyl)propane should be in order to avoid plugging the column by solidified 2,2-bis(4-hydroxyphenyl)propane or its crystallized adduct with phenol. The use of temperatures which are so high as to cause degradation of the reactants, the 2,2-bis(4-hydroxyphenyl)propane or the cation exchanging resin, or which cause an undue rate of by-product formation is to be avoided. The specific temperature employed can vary from about 30° C. to 125° C. depending upon the other operating conditions, within the reaction zone, such as percent conversion per pass, residence time or length of time of contact between catalyst and reactants, pressure, and the like. In order to avoid plugging of the reaction zone with solidified reaction products, which may occur at temperatures much below 40° C. and in order to achieve reasonable rates of conversion to 2,2-bis(4-hydroxyphenyl)propane, temperatures preferably range from about 40° C. to about 100° C.

Optimum results both as regards rate of reaction and yield are obtained by the use of temperatures within the range of 70° C. to 90° C., and these temperatures are, therefore, particularly preferred. The reaction zone can be at atmospheric, sub-atmospheric or superatmospheric pressures. It is also within the scope of our invention to employ an inert atmosphere within the reaction zone. In general, the use of atmospheric pressure or a slightly elevated pressure is preferred to ensure adequate flow of materials through the system in continuous operations.

It is another advantage of our process that superatmospheric pressure is not required in the reaction zone to maintain catalyst concentration at the desired level during operation as must be done with heretofore known processes which employ gaseous or vaporous mineral acid catalysts and sometimes gaseous or vaporous catalyst promoters.

We employ cation exchange resins as solid catalysts in the continuous process of our invention. These resins are insoluble in the reaction mixture and hence the problem of catalyst separation from the reaction zone effluent and the removal of small amounts of catalyst impurities in the product is obviated. Throughout the reaction steps and isolation steps the catalyst remains in the reaction zone and does not appear elsewhere in the process equipment. Its service life in this process is nearly infinite and does not of necessity have to be regenerated, if care is exercised in preventing the introduction of basic metal ions such as sodium, potassium, calcium etc., or other contaminants which inactivate the ion exchanging groups of the resin. The use of the insoluble catalyst confers the additional advantages of (1) eliminating the need for acid corrosion resistant equipment which is otherwise essential and (2) making unnecessary the neutralization steps which are common to other processes.

The ion exchange resins useful in our process are substantially insoluble polymeric skeletons with acidic cationic exchanging groups chemically bound thereto. The exchange potential of the bound acidic groups and the number of them which are available for contact with the phenol and acetone reaction mixture determines the catalytic effectiveness of a particular ion exchange resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur only on the ion exchange resin's surfaces; therefore, a form of resin which provides a maximum amount of surface area, e.g., porous microspheres or beads, is highly desirable and affords the highest rate of reaction and reaction economy in this process. The particular form of the ion exchange resin used, however, is not critical.

The ion exchange resins should be substantially insoluble in the reaction mixture and in any solvent to which the resin may be exposed in service. Resin insolubility is generally due to a high degree of cross-linking within the resin but can be caused by other factors, e.g. high molecular weight or a high degree of crystallinity.

In general, the greater the exchange capacity of a resin, i.e. the greater the number of milliequivalents of acid per gram of dry resin, the more desirable the resin is for use in our process. Resins having an exchange capacity greater than about two milliequivalents of acid per gram of dry resin are preferred. Particularly preferred are resins with bound cationic exchanging groups of the stronger exchange potential acids. Results obtained with bound sulfonic acid groups have been highly satisfactory. Among the ion exchange resins which are highly suited to use in our process are: sulfonated styrene-divinylbenzene copolymers, sulfonated cross-linked styrene polymers, phenol formaldehyde sulfonic acid resins, benzene-formaldehyde-sulfonic acid resins, and the like. Most of these resins and many others are available commercially under trade names such as: Amberlite XE-100 (Rohm and Haas Co.); Dowex 50-X-4 (Dow Chemical Co.); Permutit QH (Permutit Co.); and Chempro C-20 (Chemical Process Co.).

Many ion exchange resins are received from the manufacturer in the form of the sodium or other salt and must be converted to the hydrogen or acid form prior to use in this process. The conversion can be easily accomplished by washing the resin with a solution of a suitable acid. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. Substantially all this water, i.e. all but about 2% as a maximum must be removed prior to use of the ion exchange resin in our process. Suitable methods for removing the water in the resin include drying the resin under reduced pressure in an oven; soaking the resin in melted anhydrous phenol for a time sufficient to fill the resin interspaces with phenol; and azeotropic distillation of water and phenol in the presence of an excess of phenol.

The resin when once conditioned in this manner to insure anhydrous conditions throughout does not require reconditioning at any time during use in the process. Alternatively, the catalyst can be conditioned after installation in the process equipment merely by running the reaction mixture through the catalyst until substantially all water is removed. In this latter procedure conditioning is accomplished by both the acetone and the phenol.

It has been found that the catalytic effectiveness of the above-described ion exchange resins is appreciably increased by treating the resin with a mercapto alcohol prior to use in our process. The presence of free phenol-acetone condensation promoters, such as alkyl mercaptans and mercapto acids in the reaction zone with the ion exchange resins, although increasing the rate of reaction, results in sulfur contamination of the 2,2-bis(hydroxyphenyl)propane product similar to that occurring with the use of equivalently promoted mineral acid catalysts. The contamination is manifested by a strong sulfur odor and can not be removed even by successive recrystallizations of the product. Thus, the advantage of a markedly accelerated reaction rate is negatived by added contamination of the product.

All the advantages of a promoted reaction can be obtained without concomitantly causing any contamination of the product by esterifying from about 3 percent to about 20 percent of the cationic exchanging groups attached to the polymeric resin skeleton with a mercapto alcohol. The use of this promoted catalyst is preferred in our invention because of the faster reaction rates and the lack of odor or other sulfur contamination in 2,2-bis(4-hydroxyphenyl)propane product prepared with the modified ion exchange resin. The preparation of these partially esterified ion exchange resin catalysts is described in the copending application of F. N. Apel, L. B. Conte, Jr. and H. L. Bender, Ser. No. 768,050, filed October 20, 1958, which is herewith incorporated by reference.

Remarkable efficiencies and economies per pound of catalyst are made possible by the use of these solid ion exchange resins. Experimental runs have shown that the resins remain catalytically effective for indefinite periods. 300 pounds of 2,2-bis(4-hydroxyphenyl) propane, or bisphenol-A, have been produced per pound of resin without any sign of the catalytic effectiveness abating. Thus, with the above-described resins a process can be run continuously and automatically with no problems of catalyst regeneration.

To initiate the reaction, phenol and acetone, both substantially anhydrous, i.e. less than 2.0% water content by weight as a maximum and preferably anhydrous, i.e. less than 0.2% water content by weight, are heated to reaction temperature and passed into a fixed bed of ion exchange resin, preferably downward, at a slight pressure to maintain an adequate rate of flow through the bed, although gravity flow through the column is equally satisfactory.

The effluent from the catalyst bed is passed through a concentrator, which may be any conventional film type evaporator, preferably one having counter-current vapor liquid flow, where all the water and acetone and a portion of the phenol are removed as overhead.

Depending upon the temperature of the effluent from the reactor and the pressure employed in the concentrator, the reaction mixture may be heated or cooled in order to cause the vaporization of all the water of reaction, and the unreacted acetone. Such vapors are removed overhead, permissibly with some phenol vapors, leaving as a residue or bottoms the 2,2-bis(4-hydroxyphenyl)propane, phenol and by-products. The temperature of this concentration should not be so high as to cause decomposition of the 2,2-bis(4-hydroxyphenyl)propane and is preferably conducted at a temperature between about 100° C. to about 150° C., with the operating pressure adjusted such that substantially complete vaporization of the acetone and the water is achieved, and leaving at least one mole of phenol per mole of 2,2-bis(4-hydroxyphenyl)-propane, and preferably 4 to 10 moles of phenol, in the residue along with substantially all the by-products and the 2,2-bis(4-hydroxyphenyl)propane.

Concentrating the effluent simplifies the recovery of the bisphenol by reducing the number of components in the product stream and permits control of its composition. This control of the amount of phenol in the composition can be used to raise the crystallization point of the adduct, and thereby facilitate the washing of the adduct with dry phenol at a desirable temperature. Concentrating also serves to isolate that portion of the product stream containing the water, and dehydration can then be accomplished by distillation at any convenient temperature or holdup time.

The overhead, comprising acetone, water and phenol, from the concentrator is passed into a dehydrating zone for removal of the water leaving acetone and phenol, which are recycled to the process. We have discovered that this dehydration can be accomplished in a novel manner by contacting the acetone, water and phenol mixture with a rising stream of dry acetone vapors. This avoids the addition of another component to the reaction process and permits recycling of dry phenol and acetone. In this procedure, the mixture is fed to the side of the column and dry acetone is introduced at the bottom of the column which is maintained at a temperature of about 155° C. to 165° C. at atmospheric pressures. The dry acetone passes up the column contacting the feed and effectively removes the water therefrom. The moisture bearing acetone vapors are taken off at the top of the column which is maintined at a temperature of about 58° C. when operating at atmospheric pressures by controlling the reflux ratio. Control of the temperature at the top of the column is required to insure that a phenol-free acetone-water distillate is passed to the second column where the water is removed by fractional distillation. The recovered dry acetone is recycled.

The bottoms from the first column, consisting of dry phenol and acetone, are recycled to the process.

The water appearing as bottoms from the second column can be discarded without requiring further purification to remove phenol or other organic material.

The bottoms from the concentrator consisting of 2,2-bis(4-hydroxyphenyl)propane, phenol and intermediate by-products such as Dianin's compound (4-p-hydroxyphenyl-2,2,4-trimethylchroman), the 2,4'-dihydroxy 2,2-diphenyl propane and a triphenol, are passed to a crystallization zone.

The crystallization step is carried out by chilling the bottoms from the concentrator to a temperature between about 37° C. and 95° C. The concentration of the feed to the crystallization zone will vary depending on the operating conditions in the concentrator. By distilling off more or less phenol, the molar ratio of phenol to product in the crystallization zone feed is adjustable. Phenol in excess of one mole per mole of 2,2-bis(4-hydroxyphenyl)-propane takes up the intermediate by-products, all of which are soluble in phenol in the temperature range of 37° C. to 95° C. along with a portion of 2,2-bis(4-hydroxyphenyl)propane. The greatest portion of the 2,2-bis(4-hydroxyphenyl)propane crystallizes out as an adduct with phenol in 1:1 molar ratio.

The crystals are separated from the mother liquor by centrifugation, filtration, or other suitable means and washed, preferably with additional phenol or a phenol-acetone mixture to remove traces of mother liquor. The washings and mother liquor, which at this point consist of phenol, by-products, and some 2,2-bis(4-hydroxyphenyl)propane are recycled to the reaction zone, for reasons hereinafter set forth.

The washed crystals of the 1:1 adduct of phenol and 2,2-bis(4-hydroxyphenyl)propane are melted and charged to a second evaporation zone wherein phenol is stripped from the 2,2-bis(4-hydroxyphenyl)propane and recycled to the process leaving the 2,2-bis(4-hydroxyphenyl)propane as the bottoms. The 2,2-bis(4-hydroxyphenyl)propane product obtained, contains no traces of catalyst or promoter. Process efficiencies range from 95–99 percent even at product purities of 99% or better.

An important feature which contributes significantly to the over-all efficiency of the process is the recycling of the reaction by-products, i.e. Dianin's compound, bisphenol isomers and triphenols, etc., to the reactor feed.

Surprisingly, we have found that an equilibrium is thereby maintained between the product and the by-products in the reactor such that under steady state recycle conditions the concentration of by-products in the reactor remains constant. Consequently, no further build-up of by-products results, and high process efficiencies of 99 percent and above are attained.

In order to set forth more fully the nature of our invention for the steady-state, continuous production of a high purity, 2,2-bis(4-hydroxyphenyl)propane, a preferred embodiment thereof is described hereinbelow in detail with reference to the attached drawing, wherein the single FIGURE illustrates one form of apparatus and sequence of processing steps suitable for carrying out the method of the invention.

Referring to the drawing, the reactor feed is continuously prepared in the feed tank 11 from: (1) make-up phenol from line 10; (2) make-up acetone from line 9; (3) a recycled phenol-acetone mixture from line 46; and (4) a recycled mixture of phenol, reaction by-products and bisphenol A from line 27. These four streams are blended in such proportions as will maintain a constant reactor feed composition with respect to all components entering the process and also maintain the desired balance of concentrations between 2,2-bis(4-hydroxyphenyl)propane and reaction by-products. The concentration of the latter is preferably maintained at the desired process equilibrium value of about 8.0 weight percent of the reactor feed. The molar ratio of phenol to acetone is preferably maintained at about 10:1.

The intermixed streams forming the reactor feed are continuously passed through line 12, through a pre-heater 13, wherein they are heated to a temperature of about 70° C. to 75° C. prior to entrance into the reaction zone.

The reaction zone comprises a reactor 15 which is suitably an elongated chamber provided with a means for heat removal and temperature control, and with a fixed bed of a cation exchanging resin of the type prepared as described previously, and preferably the resin sold as Dowex 50X–4 which has had about 20% of its available free acid groups esterified with mercapto ethanol promotor as described in the co-pending application of F. N. Apel and L. B. Conte and H. L. Bender, Ser. No. 768,050 referred to above. The resin catalyst is placed in the reactor 15 in a manner which permits flow of the reactor feed through the catalyst bed, and also assures adequate contact of the reactor feed with substantially all the catalyst, and also prevents entrainment of the solid catalyst in the process stream flowing from the reactor chamber.

The reactor feed after passage through the preheater 13 continuously enters the top of the reactor 15, through line 14 at such a rate of flow as to provide an average residence time of reactants with catalyst of about one hour at a controlled temperature of about 75° C. to give a conversion to 2,2-bis(4-hydroxyphenyl)propane of about 50 mole percent based on acetone. The effluent stream from the reaction chamber enters line 16, and is mixed with a portion of recycled phenol wash liquor, from line 28, and the mixture passed continuously through line 17 to an evaporation zone.

The evaporation zone, hereafter referred to as the concentrator 18 consists most suitably of any commercial, continuous film-type evaporator with counter-current vapor-liquid flow and preferably operated under reduced pressure. The evaporator feed in line 17 consisting of phenol, unreacted acetone, water of reaction, 2,2,-bis(4-hydroxyphenyl)propane and reaction by-products continuously enters the concentrator 18 wherein the pressure is sufficiently low, e.g. 200 mm. Hg abs., to permit the removal of unreacted acetone and water of reaction from the concentrator product by evaporation. The product is passed into line 19 at a temperature preferably below 150° C. The amount of evaporation is controlled so that acetone and water are completely removed from the concentrator product. Also a portion of phenol is removed so that a constant concentration of the components in the concentrator product is maintained. The preferred amount of evaporation which meets the above requirements is about 20 weight percent of the feed stream to the concentrator.

The concentrator bottoms product, now consisting only of 2,2-bis(4-hydroxyphenyl)propane, phenol and reaction by-products are continuously passed through line 19 to a crystallization zone most suitably consisting of a cooling type crystallizer 20 equipped with sufficient means for circulating the magma and a means for heat removal and temperature control.

Cooling of the mass to a temperature of preferably about 40° C. with the aforementioned agitation results in a slurry of crystals consisting only of the 1:1 molar adduct of phenol and 2,2-bis(4-hydroxyphenyl)propane in its mother liquor. The resulting slurry is passed through line 21 to a solids-liquid separation zone.

The solids-liquid separation zone comprises a solid-liquid separator 22, suitably a filtration apparatus, and preferably a centrifugal machine equipped with accessories for crystal washing and a means for temperature control. The separation of mother liquor from crystals is preferably carried out at a temperature of about 40° C.

The crystals, after separation from their mother liquor, are washed with anhydrous phenol from line 25, the amount of wash and washing techniques used depending on the end product purity desired. A final separation of the crystals, consisting only of the 1:1 molar adduct of phenol and 2,2-bis(4-hydroxyphenyl)propane from the wash liquor is carried out suitably in a filtration apparatus and preferably in a centrifugal machine equipped with accessories for crystal washing and a means for temperature control. The mother liquor is passed through line 23, and a portion of the wash liquor is passed through line 26 and then these are combined and returned along line 27 to the reactor feed tank 11 as recycle. The combined mother liquor and wash liquor used as recycle consists of phenol, reaction by-products and some 2,2-bis(4-hydroxyphenyl)propane. As hereinbefore stated, the recycle of reaction by-products secures ultimate yields of 2,2-bis(4-hydroxyphenyl)propane of 99 percent plus in this process.

The remainder of the wash liquor is passed along line 28 to be combined with the reactor effluent stream in line 16 for feed to the concentrator through line 17.

The washed crystals of the 1:1 molar adduct of phenol and 2,2-bis(4-hydroxyphenyl)propane are discharged from the solids-liquid separation zone along line 29 to a melting zone, suitably a melter 30 such as an agitated tank with a means for temperature control, wherein the crystals are melted at a temperature about 130° C. into a melt of 2,2-bis(4-hydroxyphenyl)propane in phenol. The melt is fed along line 31 to a final evaporation zone. In the final evaporation zone, which suitably comprises one or more commercial film type evaporators 32, the phenol is evaporated from the 2,2-bis(4-hydroxyphenyl)-propane product preferably at a pressure sufficiently low (e.g. 5 mm. Hg abs.) to insure complete evaporation of phenol from the evaporator product, at a temperature not exceeding 200° C.

The evaporator product consisting of a molten stream of 2,2-bis(4-hydroxyphenyl)propane of high purity is passed through line 33 to a cooling zone, suitably a rotating drum flaking device 34 equipped with temperature control to be solidified and flaked. The flaked product is discharged to be packaged.

The distillate from the final evaporation passes along line 36 to be combined with anhydrous phenol which enters the process from an outside source along line 24.

The distillate from the concentrator 18 consisting of some phenol, unreacted acetone and water of reaction are passed along line 37 to a distillation zone to recover essentially anhydrous acetone and phenol from recycle. The distillation zone consists of two columns 38 and 41 each consisting of a stripping section, a rectification section and a reboiler, and equipped with temperature and reflux ratio control. The distillate from the concentrator enters the column 38 at about the midpoint; dry acetone enters the column at the reboiler along line 44. Acetone and water are stripped from the feed to the column, and an essentially anhydrous mixture of phenol and acetone is obtained at the bottom of the column and is returned along line 39 to the reactor feed tank 11 as recycle. The composition of the distillate from column 38 is controlled by adjusting the temperature at the top of the column. This distillate, consisting only of acetone and water leaves the column 38 along line 40 and enters a second column 41 wherein the acetone and water are separated—water leaving the column as bottoms along line 42 and dry acetone leaving the column as distillate along line 43. A portion of the dry acetone from column 41 is combined with the anhydrous phenol-acetone mixture from column 38 along line 45 to be recycled to the reactor feed tank 11 along line 46. The remainder of the dry acetone from column 41 is returned to the bottom of column 38 by line 44 to be reused in that column. The columns are preferably operated at about atmospheric pressure.

In previous processes, sulfur-containing by-products were frequently returned in the recycle stream to build up in concentration and eventually seriously impair process efficiency or require costly elimination steps. But, because the promoters in this process are bound to the polymeric catalyst, no sulfur-containing by-products are formed in the reaction and hence, none are free within the reaction zone, or present in process equipment or in the 2,2-bis(4-hydroxyphenyl)propane product to lower its purity or to necessitate costly purification procedures.

The efficiency with which ultra-high purity 2,2-bis(4-hydroxyphenyl)propane is produced in accordance with the present invention is clearly shown by the following examples which are illustrative of the practice of our invention and are not to be construed as limiting thereof.

EXAMPLE I

One hundred pounds of reactor feed were made up from: recycled mother liquor and wash liquor from the solids-liquid separator; recycled anhydrous phenol-acetone mixture from the dehydration columns, and make-up phenol and acetone. The feed had the following composition:

| | Percent by weight |
|---|---|
| Phenol | 83.4 |
| Acetone | 5.1 |
| Water | 0.1 |
| Bisphenol-A | 3.4 |
| By-products | 8.0 |

This feed was continuously metered to a reaction consisting of a jacketed stainless steel tube packed with five pounds of the Dowex 50X–5 ion exchange resin which had previously been rendered to a promoted form by esterifying 20% of the free acid groups with mercapto ethanol and then rendered to an anhydrous condition by the methods set forth in U.S. application Ser. No. 768,050. Water at a temperature of 70–75° C. was circulated through the jacket of the reactor and a feed pre-heater. The feed was metered to the reactor at such a rate sufficient to yield a retention time of reactants with catalyst of one hour.

The exit stream from the reactor was passed to the concentrator consisting of a glass-lined jacketed autoclave equipped with condenser and receiver. The exit stream from the reactor had the following composition:

| | Percent by weight |
|---|---|
| Phenol | 75.0 |
| Acetone | 2.5 |
| Water | 1.0 |
| Bisphenol-A | 13.4 |
| By-products | 8.1 |

Conversion based on acetone consumed=51%.

The effluent stream from the reactor was concentrated under a reduced pressure of 200 mm. Hg abs. to a temperature of 140° C. 20% by weight of the charge was removed as distillate which had the following composition:

| | Percent by weight |
|---|---|
| Phenol | 82.5 |
| Acetone | 12.5 |
| Water | 5.0 |

The concentrate had the following composition:

| | Percent by weight |
|---|---|
| Phenol | 73.13 |
| Bisphenol-A | 16.75 |
| By-products | 10.12 |

The concentrate was cooled in a crystallizer consisting of a jacketed glass-lined autoclave with agitation maintained at a temperature of 40° C., wherein the 1:1 molar adduct of 2,2-bis(4-hydroxyphenyl)propane and phenol crystallized from the concentrate. The concentration of crystals in the magma was approximately 15% by weight.

The slurry of crystals and mother liquor was charged intermittently to a perforate basket centrifuge maintained at a temperature of 40–45° C. The centrifuge cake of adduct crystals were spun to near dryness and the separated mother liquor was collected. The centrifuge cake was then spray washed with about ⅕ of its weight of molten phenol at a temperature of 40–45° C. and the centrifuge cake spun dry of wash liquor. The wash liquor was collected in the same container as the aforementioned separated mother liquor. The combined filtrate separated from the centrifuge cake had the following composition:

|  | Percent by weight |
|---|---|
| Phenol | 82.9 |
| Bisphenol-A | 5.1 |
| By-products | 12.0 |

This filtrate was passed to recycle for the reactor feed.

The washed centrifuge cake was removed intermittently from the perforate basket centrifuge with the following composition:

|  | Percent by weight |
|---|---|
| Bisphenol-A-phenol adduct | 88.3 |
| Phenol | 11.1 |
| By-products | 0.6 |

The centrifuge cake was heated to a temperature of about 130° C. in an agitated, jacketed vessel to melt the adduct crystals, the melt then passed to a vacuum evaporator wherein phenol was evaporated from the product under a reduced pressure of 1.0 mm. Hg abs. at a temperature of 200° C. The molten product from the evaporator was cooled to crystallize the product which was then pulverized. The product had the following composition:

|  | Percent by weight |
|---|---|
| Bisphenol-A | 98.8 |
| Phenol | 0.3 |
| By-products | 0.9 |

The product had a melting point of 155° C.

The distillate from the concentrator 18 was passed to the dehydration column and was dehydrated by introducing about 30 parts by weight of dry acetone per part by weight of water to be removed into the column reboiler.

The rising acetone vapors were contacted with the distillate and water distilled off with the acetone at about 58° C. as a binary mixture having a composition of about 96.5 wt. percent acetone and 3.5 wt. percent water. This was passed to a second dehydration column where it was fractionated to yield essentially dry acetone containing less than 0.5% by weight of water and was recycled to the first column. The water was discharged to waste. Phenol content of the water was below one part per million.

The bottoms from the first column recycled to the feed had the composition:

|  | Percent by weight |
|---|---|
| Phenol | 93.8 |
| Acetone | 5.6 |
| Water | 0.6 |

EXAMPLE II

Two hundred and sixteen pounds of reactor feed were made up from: recycled mother liquor and a portion of recycled wash liquor from the solids-liquid separator; recycled and anhydrous phenol-acetone mixture from the dehydration columns; and make-up phenol and acetone. The feed had the following composition:

Feed to Reactor

|  | Percent by weight |
|---|---|
| Phenol | 81.3 |
| Acetone | 4.6 |
| Water | 0.3 |
| Bisphenol-A | 4.6 |
| By-products | 9.2 |

This feed was continuously metered to the reactor which was packed with an ion exchange resin and heated to 70–75° C., as described in Example I.

The effluent stream from the reactor had the following composition:

Exit Stream from Reactor

|  | Percent by weight |
|---|---|
| Phenol | 73.9 |
| Acetone | 2.3 |
| Water | 1.0 |
| Bisphenol-A | 13.6 |
| By-products | 9.2 |

Conversion based on acetone consumed=50%.

24 pounds of recycled wash liquor from the solids-liquid separator was added to the 216 pounds of reactor effluent. The composition of the mixture was:

|  | Percent by weight |
|---|---|
| Phenol | 75.5 |
| Acetone | 2.1 |
| Water | 1.0 |
| Bisphenol-A | 12.8 |
| By-products | 8.6 |

This mixture was passed to a concentrator consisting of a glass-lined jacketed autoclave equipped with condenser and receiver and was concentrated under a reduced pressure of 200 mm. Hg. abs. to a temperature of 140° C. to remove about 18% by weight of the charge as a distillate which had the following composition:

|  | Percent by weight |
|---|---|
| Phenol | 83.6 |
| Acetone | 11.4 |
| Water | 5.0 |

The concentrate had the following composition:

|  | Percent by weight |
|---|---|
| Phenol | 75.2 |
| Bisphenol-A | 15.0 |
| By-products | 9.8 |

The concentrate was cooled with agitation in a crystallizer consisting of a jacketed glass-lined autoclave to a temperature of 40° C. wherein the 1:1 molar adduct of 2,2-bis(4-hydroxyphenyl)propane and phenol crystallized from the concentrate. The concentration of crystals in the magma was approximately 15% by weight.

The slurry of crystals and mother liquor was fed continuously to a Sharples Continuous Centrifuge (Model PD-4) maintained at a temperature of 40–45° C. The separated mother liquor was returned to the reactor feed as recycle and had the following composition:

|  | Percent by weight |
|---|---|
| Phenol | 82.6 |
| Bisphenol-A | 6.0 |
| By-products | 11.4 |

The separated crystals of the 1:1 molar adduct of 2,2-bis(4-hydroxyphenyl)propane and phenol along with adhering mother liquor were charged to a jacketed stainless steel autoclave equipped for agitation and which contained an amount of phenol approximately equal to 70% of the crystal weight at a temperature of 42° C.

The slurry, after agitation for approximately 30 minutes at 42° C., was charged intermittently to a perforate basket centrifuge maintained at a temperature of 40–45° C. The centrifuge cake of adduct crystals were spun to near dryness to separate the phenol slurry wash which was collected. The centrifuge cake was then spray washed with about ⅕ of its weight of molten phenol at a temperature of 40–45° C. and the centrifuge cake spun dry of wash liquor. This wash liquor was collected in the same container as the separated slurry wash liquor. The combined filtrate separated from the centrifuge cake had the following composition:

| | Percent by weight |
|---|---|
| Phenol | 92.3 |
| Bisphenol-A | 6.0 |
| By-products | 1.7 |

This filtrate was passed to recycle to the reactor effluent stream.

The washed centrifuge cake was removed intermittently from the perforated basket centrifuge with the following composition:

| | Percent by weight |
|---|---|
| Bisphenol-A-phenol adduct | 88.3 |
| Phenol | 11.6 |
| By-products | 0.1 |

The centrifuge cake was heated to 130° C. and the melt charged to a vacuum evaporator wherein the phenol was evaporated off and the residue cooled to crystallize in the manner described in Example 1.

The product had the following composition:

| | Percent by weight |
|---|---|
| Bisphenol-A | 99.7 |
| Phenol | 0.1 |
| By-products | 0.2 |

The distillate from the concentrator was passed to a distillation column as in Example I and the bottoms from this column, which contain less than 0.6% water returned to the reactor feed as recycle.

What is claimed is:

1. A process for the production of 2,2-bis(4-hydroxyphenyl)propane which includes the steps of contacting acetone with a stoichiometric excess of phenol under substantially anhydrous conditions in a reaction zone maintained at a temperature of from about 30° to about 125° C., said reaction zone comprising a substantially insoluble cation exchanging resin, maintaining at least a part of said acetone and said phenol in said reaction zone in the liquid phase for a period of time between that sufficient to initiate interreaction of said acetone with said phenol and that sufficient to substantially complete said interreaction, thereby forming an incompletely reacted reaction mixture containing 2,2-bis(4-hydroxyphenyl)propane, an adduct of 2,2-bis(4-hydroxyphenyl)propane and phenol, unreacted acetone and unreacted phenol, reaction by-products, and water, withdrawing said incompletely reacted reaction mixture from said reaction zone, separating the withdrawn mixture into an overhead stream comprising acetone, water and phenol and a bottoms stream comprising 2,2-bis(4-hydroxyphenyl)propane, an adduct of 2,2-bis(4-hydroxyphenyl)propane and phenol, phenol and reaction by-products; dehydrating said overhead stream, recycling substantially anhydrous phenol and acetone to said reaction zone; separating from the bottoms stream the adduct of 2,2-bis(4-hydroxyphenyl)propane and phenol, recycling the remainder of the bottoms stream to said reaction zone, separating the 2,2-bis(4-hydroxyphenyl)propane from the adduct thereof with phenol, and recycling the phenol of the adduct.

2. The process claimed in claim 1 wherein anhydrous acetone and phenol are obtained from the stream containing acetone, phenol and water by contacting at substantially atmospheric pressures said stream with rising anhydrous acetone vapors distilling over some of the acetone and all of the water as a binary system from the stream, recovering anhydrous phenol and anhydrous acetone as bottoms, fractionally distilling the acetone/water binary system, and recovering the anhydrous acetone as overhead.

3. The process claimed in claim 1 wherein the substantially insoluble cation exchanging resin has been partially esterified with a mercapto alcohol.

4. Process claimed in claim 1 wherein the substantially insoluble cation exchanging resin is a sulfonated styrene divinyl benzene copolymer.

5. The process claimed in claim 4 wherein 3% to 20% of the cation exchanging groups of the substantially insoluble cation exchanging resin having been esterified with a mercapto alcohol.

6. A process for the production of 2,2-bis(4-hydroxyphenyl)propane which includes the steps of contacting acetone with a stoichiometric excess of phenol under substantially anhydrous conditions in a reaction zone maintained at a temperature of from about 30° to about 125° C., said reaction zone comprising a substantially insoluble cation exchanging resin, maintaining at least a part of said acetone and said phenol in said reaction zone in the liquid phase for a period of time between that sufficient to initiate interreaction of said acetone with said phenol and that sufficient to substantially complete said interreaction, thereby forming an incompletely reacted reaction mixture containing 2,2-bis(4-hydroxyphenyl)propane, an adduct of 2,2-bis(4-hydroxyphenyl)propane and phenol, unreacted acetone and unreacted phenol, reaction by-products, and water, withdrawing said incompletely reacted reaction mixture from said reaction zone, separating the withdrawn mixture into a bottoms stream comprising 2,2-bis(4-hydroxyphenyl)propane, an adduct of 2,2-bis(4-hydroxyphenyl)propane and phenol, reaction by-products and some free phenol and an overhead stream comprising some unreacted acetone, water and the remainder of the free phenol, removing the water from the overhead stream by azeotropic distillation, dehydrating the azeotrope, recycling substantially anhydrous phenol and acetone thereby obtained to said reaction zone; separating from the bottoms stream the adduct of 2,2-bis(4-hydroxyphenyl)propane and phenol, recycling the remainder of the bottoms stream to said reaction zone, distilling the phenol from the said adduct, removing the 2,2-bis(4-hydroxyphenyl)propane thus obtained from the reaction system and recycling the distilled phenol.

7. Process claimed in claim 6 wherein the substantially insoluble cation exchanging resin is a sulfonated styrene divinyl benzene copolymer.

8. A continuous process for the production of 2,2-bis(4-hydroxyphenyl)propane including the steps of continuously contacting acetone with a stoichiometric excess of phenol under substantially anhydrous conditions in a reaction zone maintained at a temperature of from about 30° to about 125° C., said reaction zone comprising a substantially insoluble cation exchanging resin, maintaining at least a part of said acetone and said phenol in said reaction zone in the liquid phase for a period of time sufficient to effect the inter-reaction of up to 80% of said acetone with said phenol in said reaction zone, thereby forming an incompletely reacted reaction mixture containing 2,2-bis(4-hydroxyphenyl)propane, an adduct of 2,2-bis(4-hydroxyphenyl)propane and phenol, unreacted acetone and unreacted phenol, reaction by-products, and water, continuously withdrawing said incompletely reacted reaction mixture as an effluent from said reaction zone, continuously separating said effluent into two streams, continuously passing one stream containing acetone, water and phenol to a dehydrating zone, continuously separating said phenol from said acetone and water and continuously separating substantially all of said water from said acetone, recycling substantially anhydrous phenol and acetone to said reaction zone; continuously passing a second stream containing 2,2-bis(4-hydroxyphenyl)propane, an adduct of 2,2-bis(4-hydroxyphenyl)propane and phenol, phenol and reaction by-products to an isolation zone separating the adduct of 2,2-bis(4-hydroxyphenyl)propane and phenol from the remainder of said second stream, recycling said remainder to the reaction zone, separating the 2,2-bis(4-hydroxyphenyl)propane from the adduct of 2,2-bis(4-hydroxyphenyl)propane and phenol, and recycling the phenol.

9. A process for the production of 2,2-bis(4-hydroxyphenyl)propane including the steps of contacting acetone with phenol in a molar ratio of about 1:3 to 1:20 under substantially anhydrous conditions in a reaction zone maintained at a temperature of from about 40° C. to about 100° C. said reaction zone comprising a substantially insoluble cation exchanging resin, maintaining at least a part of the acetone and phenol present in said reaction zone in the liquid phase for a period sufficient to permit inter-reaction of at least about 20% and no more than 80% of said acetone and phenol withdrawing from said reaction zone a reaction mixture containing 2,2-bis(4-hydroxyphenyl)propane, an adduct of 2,2-bis(4-hydroxyphenyl)propane and phenol, acetone, free phenol, reaction by-products, and water, separating said reaction mixture under reduced pressures into an overhead stream containing acetone, water and some free phenol and a bottoms stream containing 2,2-bis(4-hydroxyphenyl)propane, the adduct of 2,2-bis(4-hydroxyphenyl)propane and phenol, free phenol and reaction by-products; recovering the phenol and acetone from the overhead stream and recycling substantially anhydrous phenol and acetone to the reaction zone, removing the water in the overhead stream from the process; cooling the bottoms stream to below the melting point of the adduct, separating the adduct, recycling the remainder of the bottoms stream to the reaction zone, treating the adduct to isolate the 2,2-bis(4-hydroxyphenyl)propane, recycling phenol of the adduct to the reaction zone.

10. A process for the production of 2,2-bis(4-hydroxyphenyl)propane including the steps of contacting acetone with phenol in a molar ratio of about 1:6 to 1:12 under substantially anhydrous conditions in a reaction zone maintained at a temperature of from about 70° C. to about 90° C. said reaction zone comprising a substantially insoluble cation exchanging resin, maintaining at least a part of the acetone and phenol present in said reaction zone in the liquid phase for a period sufficient to permit inter-reaction of at least about 20% and not more than 80% of said acetone and phenol, withdrawing from said reaction zone a reaction mixture containing 2,2-bis(4-hydroxyphenyl)propane, an adduct of 2,2-bis(4-hydroxyphenyl)propane and phenol, acetone, free phenol, reaction by-products, and water, separating said reaction mixture under reduced pressures into an overhead stream containing acetone, water and some free phenol and a bottoms stream containing 2,2-bis(4-hydroxyphenyl)propane, the adduct of 2,2-bis(4-hydroxyphenyl)propane and phenol, free phenol and reaction by-products; recovering the phenol and acetone from the overhead stream and recycling substantially anhydrous phenol and acetone to the reaction zone, removing the water in the overhead stream from the process; cooling the bottoms stream to below the melting point of the adduct, separating the adduct, recycling the remainder of the bottoms stream to the reaction zone, treating the adduct to isolate the 2,2-bis(4-hydroxyphenyl)propane, and recycling phenol of the adduct to the reaction zone.

11. A process for the production of 2,2-bis(4-hydroxyphenyl)propane including the steps of contacting acetone with phenol in a molar ratio of 1:10 under substantially anhydrous conditions in a reaction zone maintained at a temperature of from about 70° C. to about 75° C., said reaction zone comprising a substantially insoluble cation exchanging resin, maintaining at least a part of the acetone and phenol present in said reaction zone in the liquid phase for a period sufficient to permit inter-reaction of about 20% and not more than 80% of said acetone and phenol, withdrawing from said reaction zone a reaction mixture containing 2,2-bis(4-hydroxyphenyl)propane, an adduct of 2,2-bis(4-hydroxyphenyl)propane and phenol, acetone, free phenol, reaction by-products, and water, separating said reaction mixture under reduced pressures into an overhead stream containing acetone, water and some free phenol and a bottoms stream containing 2,2-bis(4-hydroxyphenyl)propane, the adduct of 2,2-bis(4-hydroxyphenyl)propane and phenol, free phenol and reaction by-products; recovering the phenol and acetone from the overhead stream and recycling substantially anhydrous phenol and acetone to the reaction zone, removing the water in the overhead stream from the process; cooling the bottoms stream to below the melting point of the adduct, separating the adduct, recycling the remainder of the bottoms stream to the reaction zone, heating the adduct under reduced pressures, isolating the 2,2-bis(4-hydroxyphenyl)propane, recycling the phenol of the adduct to the reaction zone.

12. The process claimed in claim 11 wherein the 15 to 20% of the cation exchanging groups of the substantially insoluble cation exchanging resin have been esterified with a lower alkyl mercapto alcohol.

13. The process claimed in claim 12 wherein less than 0.2% by weight of water is present in the reaction feed.

References Cited in the file of this patent

UNITED STATES PATENTS

| | | |
|---|---|---|
| 2,232,674 | Pyzel | Feb. 18, 1941 |
| 2,259,951 | Eversole et al. | Oct. 21, 1941 |
| 2,494,758 | Hartough et al. | Jan. 17, 1950 |
| 2,572,141 | Harris | Oct. 23, 1951 |
| 2,623,908 | Stoesser et al. | Dec. 30, 1952 |
| 2,628,983 | Aller et al. | Feb. 17, 1953 |
| 2,669,588 | Deming et al. | Feb. 16, 1954 |
| 2,737,480 | Adams et al. | Mar. 16, 1956 |
| 2,791,616 | Luten | May 7, 1957 |

OTHER REFERENCES

Kunin et al.: "Ion Exchange Resins," pp. 137–139 (3 pages), pub. by John Wiley & Sons, Inc., New York (1950).

"Azeotropic Data," p. 7 (1 page), pub. by American Chemical Society, Washington, D.C. (1952).

"Amberlite Ion Exchange," p. 10 (1 page), pub. by Rohm & Haas Co., The Resinous Products Division, Washington Square, Philadelphia (September 1953).